Aug. 27, 1963   P. A. DICKE   3,102,218
PLURAL MOTOR REMOTE CONTROL SYSTEM
Filed June 30, 1960   2 Sheets-Sheet 1

INVENTOR.
PAUL A. DICKE
BY
HIS ATTORNEYS

Aug. 27, 1963 P. A. DICKE 3,102,218
PLURAL MOTOR REMOTE CONTROL SYSTEM
Filed June 30, 1960 2 Sheets-Sheet 2
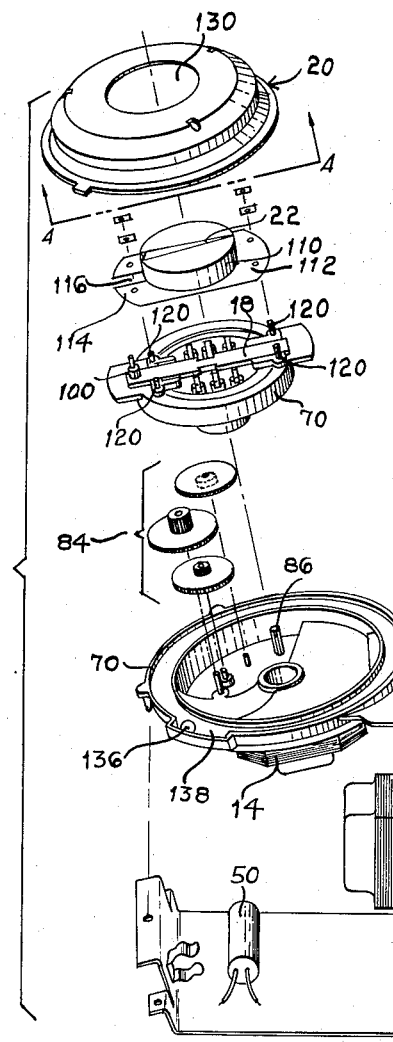
FIG.3
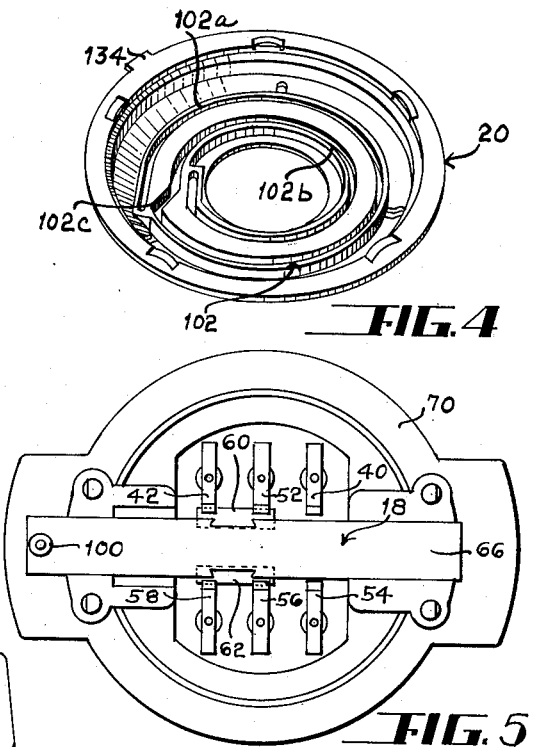
FIG.4
FIG.5
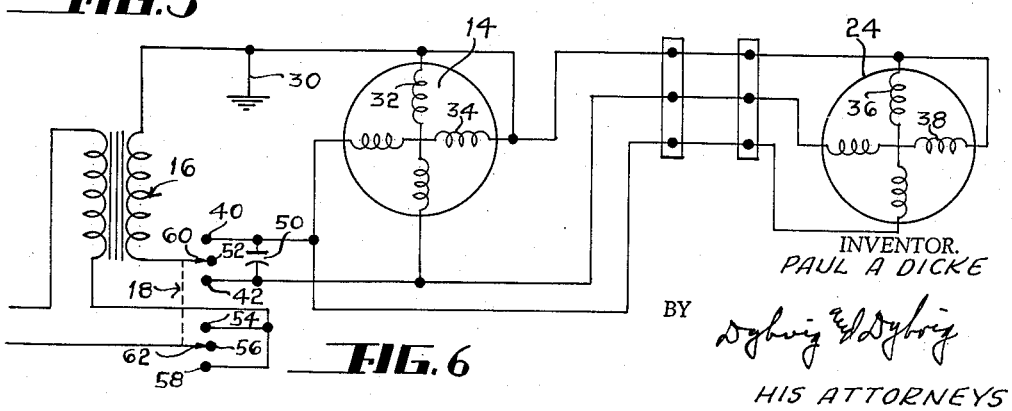
FIG.6
INVENTOR.
PAUL A DICKE
BY
HIS ATTORNEYS United States Patent Office 3,102,218
Patented Aug. 27, 1963

3,102,218
PLURAL MOTOR REMOTE CONTROL SYSTEM
Paul A. Dicke, New Bremen, Ohio, assignor to Crown Controls Corporation, a corporation of Ohio
Filed June 30, 1960, Ser. No. 39,840
10 Claims. (Cl. 318—41)

This invention relates to a remote control mechanism and more particularly to a remote control mechanism for use with an antenna rotator, although not necessarily so limited.

An object of this invention is to provide a simple switching device in association with a control for a proximal motor for actuating a servo motor at a distance. This has been accomplished by providing a switch mechanism that has three positions, one a neutral position, one for a clockwise movement of the proximal motor and another for a counterclockwise movement thereof, an actuator having a linear travel for actuating the switch mechanism from one position to another, which actuator is controlled by a cam mechanism and a cam follower, the cam mechanism having two concentric cam surfaces, one of which has a larger diameter than the other, one for the clockwise movement and one for the counterclockwise movement, the two concentric cam surfaces being connected by a diagonal surface, the mid point of which actuates the switch to a neutral position or an "off" position.

The proximal motor and the servo or distal motor are similar, both the proximal motor and the servo motor having two sets of field windings cooperating for driving the motors in a selected direction, the servo motor being selected so as to have a speed slightly greater, although not much greater, than the speed of the proximal motor, so that when the servo motor actuates the load, such as an antenna, the load slows the servo motor so as to have substantially the same rate of speed as the proximal motor, so that the two motors are substantially in synchronism.

Other objects and advantages reside in the construction of parts, the combination thereof, the method of manufacture, and the mode of operation, as will become more apparent from the following description.

In the drawings,

FIGURE 3 is an exploded view of the control unit.

FIGURE 4 is a perspective view looking in the direction of the arrows 4—4 in FIGURE 3.

FIGURE 5 is a top plan view of the switch.

FIGURE 6 is a schematic wiring diagram.

Figure 1:
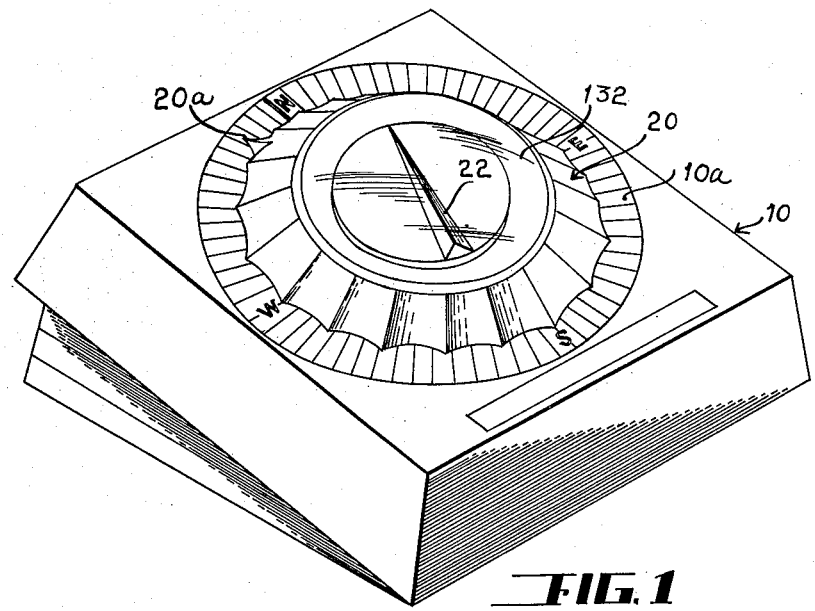
FIGURE 1 is a perspective view of the control unit.
Figure 2:
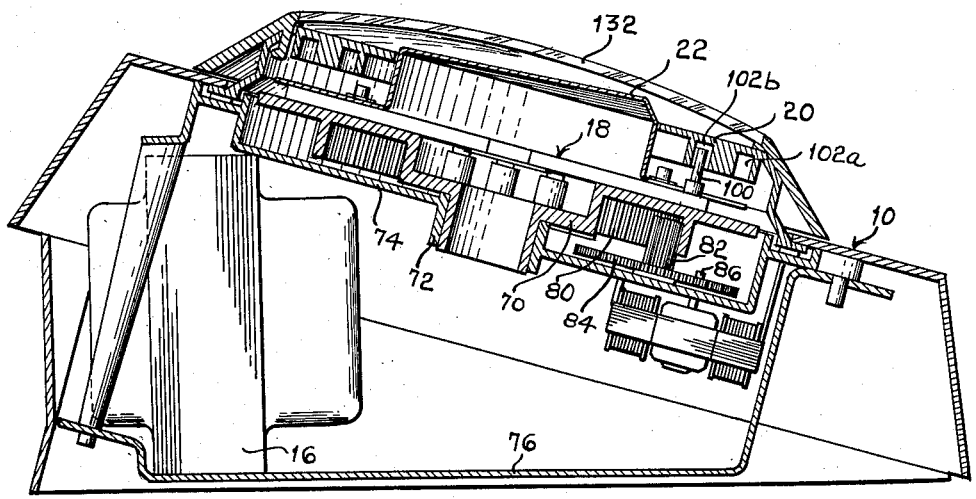
FIGURE 2 is a side elevational view of the control unit.

Referring to the drawings, the reference character 10 indicates broadly the housing for the control unit. The control unit includes a proximal motor 14, a transformer 16, a switch mechanism 18, an adjustable cam 20 and a pointer 22.

A servo motor 24 is connected in parallel with the proximal motor 14. When this remote control device is used in actuating an antenna, the servo motor, mounted in close proximity to the antenna, is driven substantially in synchronism with the motor 14. Although the motors are not synchronous, the motors have been selected with such speed characteristics that the two motors have substantially identical speeds under normal load conditions. In order to prevent the leads from being twisted, it is necessary to confine the rotary motion of each of the motors in each direction to one revolution of the loads driven thereby plus a few degrees, as for example, to an angle of 365° in each direction. This mechanism for limiting the rotation of the motors in either direction will be described more fully later.

As may be seen by referring to FIGURE 6, the secondary winding of the transformer 16 has one terminal grounded at 30, the grounded terminal being connected to the windings 32 and 34 of the motor 14 and to one terminal of the windings 36 and 38 of the servo motor. The switch mechanism 18 may have a contact 40 connected to the secondary winding of the transformer 16 to supply electrical energy directly to the windings 34 and 36. A phase shifting impedance, such as a condenser 50, connects the ungrounded terminals of the windings 32 and 38 to the contact 40. By this arrangement, as is well known to those skilled in the art, a leading current is supplied to the windings 32 and 38, which current leads the current supplied to the windings 34 and 36. This will cause the motors to revolve in one direction. By shifting the switch mechanism 18 from the contact 40 to the contact 42, the current supplied directly by the secondary winding of the transformer 16 is then supplied to the ungrounded terminals of the windings 32 and 38, the leading current being then supplied to the ungrounded terminals of the windings 34 and 36, thus reversing the direction of the motor 14 and the motor 24.

The switch mechanism is best shown in FIGURE 5. The switch 18, in addition to the contacts 40 and 42, is provided with contacts 52, 54, 56 and 58. It is to be noted that there are two movable contacts 60 and 62 mounted upon an actuating bar 66 that is slidably mounted, so that the contacts 60 and 62 connect contacts 52 and 42 together and connect the contacts 56 and 58 together, or when moved in the opposite position, the contact 60 connects the contacts 52 and 40 together and the contacts 54 and 56 together. The slidable bar 66 is made from insulating material, so that the movable contacts 60 and 62 are not electrically connected. The movable contacts 60 and 62 are shorter than the distance from the contacts 40 to 42 and the contacts 54 to 58, so that when the movable contacts 60 and 62 are centrally located, they engage only the open contacts 52 and 56, respectively. Thus the switch in its entirety is open, thereby to open-circuit both the portion that connects the line into the transformer primary circuit and the portion that connects the motor windings into the transformer secondary circuit.

A support 70 for the switch mechanism is rotatably mounted in a bushing 72 mounted in a frame member 74 fixedly mounted in the housing 10. It is to be noted that the frame member 74 is mounted on a bracket 76 supported in the bottom of the housing 10. The switch supporting member 70 is provided with gear teeth 80 meshing with a pinion 82 which is driven through a series of speed reducing gears 84 from a pinion 86 driven by the motor 14, so that when the motor rotates in one direction, the switch mechanism rotates in a clockwise direction and when the motor 14 rotates in the opposite direction, the switch mechanism rotates in a counterclockwise direction.

The mechanism for controlling the switch mechanism 18 and thereby the movement or angle of rotation and the direction of rotation of the two motors 14 and 24 will now be described.

The actuating bar 66 of the switch is driven by a cam follower 100 mounted in a cam groove 102. This cam groove consists of an outer circular portion 102a and an inner circular portion 102b and a diagonal or median connecting portion 102c. The cam grooves or cam surfaces 102a and 102b are concentric, but offset radially, so that the two arcuate cam grooves or cam surfaces are offset from each other and connected by the median portion. As the motor drives the switch mechanism, the cam follower is driven in a clockwise direction in the groove portion 102a, as viewed in FIGURE 4, until the cam follower reaches substantially mid point of the connecting groove 102c, when the switch 18 will be opened, so as to disconnect both the motor 14 and the motor 24, thereby arresting the movement of the switch mechanism. If the cam follower happens to be located in the inner groove 102b, as viewed in FIGURE 4, the cam follower will be rotated in a counterclockwise direction until it reaches the mid position of the diagonal groove 102c, when the switch will again be open-circuited.

Member 20 may be manually adjusted in a clockwise direction or a counterclockwise direction, cam member 20 being provided with an indicant 20a. Notations may be made on the graduated scale 10a of the housing 10. As shown in the drawings, it has notations indicating North, South, East and West. Names of stations may be placed in the proper spaces along the graduations 10a to indicate to the operator the position to which the indicant 20a should be adjusted, thereby rotating member 20 containing the cam grooves. As soon as rotated to the right or to the left, the cam follower will be actuated into one of the concentric cam grooves, so as to connect the two motors to rotate in a counterclockwise direction or a clockwise direction, as the case may be, the motor driving the switch mechanism always actuating the cam follower toward and finally into the diagonal cam groove 102c, at which time the switch circuit is opened. At the same time this takes place, the antenna will be rotated in a counterclockwise direction or a clockwise direction, as the case may be, by the motor 24.

The pointer 22 is mounted upon a cylindrical portion 110 merging into apertured flange portions 112 and 114, the flange portion 114 being provided with a slot 116 into which the cam follower 100 is mounted for reciprocatory movement. The apertures in the flanges 112 and 114 are seated upon pintles or pegs 120, so that as the motor actuates the switch, the pointer 22 will point in the direction of the position of the switch mechanism and of the antenna. The cylindrical portion 110 projects through an aperture 130 in cam member 20 and underlies a transparent window 132. When the pointer 22 is aligned with the indicant 20a, the cam follower is in the center of the diagonal portion 120c of the cam, so that when the pointer 22 points to the indicant 20a, rotation will stop.

A suitable stop 134, integral with the cam member 20, limits the rotation of cam member 20 in either direction. This is accomplished by mounting a roller 136 in an arcuate recess 138 in the frame member 70. This arcuate recess may extend through an angle of from 5 to 10°, so as to permit the stop 134 to actuate the roller 136 into the end of the arcuate recess 138 before arresting the movement of the cam member 20.

*Mode of Operation*

In tuning in a radio or television, it is oftentimes quite desirable to rotate the antenna into an optimum position for best reception for a particular station. When tuning to another station, it may be advantageous to shift the position of the antenna. The remotely mounted motor is used to actuate the antenna into the optimum position. This is accomplished by rotating the cam member 20 until the indicant 20a points to the proper position on the graduated scale 10a. In so doing, the cam follower 100 is moved into the proper circular cam groove 102a or 102b, so as to cause the motors to rotate, the proximal motor actuating the switch and the cam follower into the diagonal cam groove 102c when the antenna reaches the optimum position for the selected station.

When the antenna is rotated in the optimum position, the pointer 22 is then aligned with the indicant 20a, that is, providing member 20 has been adjusted into the proper position for the selected station.

In the event the motors become misaligned, it is a comparatively easy matter to reset the motors into synchronism. This may be done by actuating the proximal motor to the extreme position of one end of the arcuate cam surface, thereby actuating the distal motor to this same position. If the distal motor has advanced more rapidly than the proximal motor, when the distal motor comes to the end of its course it may be arrested in the same manner that the proximal motor is arrested, namely, at the end of the cam surface. When the distal motor reaches such a stop, it will remain stationary until the proximal motor reaches the same position. In the event the distal motor is lagging, it is merely necessary then to actuate the proximal motor in the opposite direction to the opposite end of the cam surface, so that the distal motor will then be arrested before the proximal motor reaches the end of the curve.

The proximal motor need not necessarily be an electric motor. It could be a two direction spring motor. In this event, the switch could then be driven by the spring motor until the cam surface drives the switch to a neutral position, when it stops the distal motor.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A control mechanism for a remotely mounted motor, comprising in combination: a housing; a proximal electric motor in the housing, said proximal motor being connected in parallel with the remotely mounted motor; a source of electrical energy; a switch mechanism driven by the proximal motor, said switch mechanism having three positions; namely a forward position, a reverse position and an open position; and means for actuating the switch mechanism into any one of the three positions; said means including a cam follower actuating the switch mechanism into the various positions and a cam member having two concentric cam surfaces, one of which has a larger radius than the other, and a diagonal cam surface for connecting adjacent ends of the concentric cam surfaces, the cam follower when contacting one of the concentric cam surfaces connecting the motors to the source of electrical energy to drive the cam follower toward the diagonal cam surface to thereby actuate the switch mechanism into the open position to stop rotation of both motors.

2. A control mechanism for a remotely mounted motor comprising, in combination, a proximal motor connected to the remote motor so that as one of the motors is deenergized the other is also deenergized; a switch mechanism driven by the proximal motor; said switch mechanism having two "on" positions, one for energizing the motors to rotate in one direction and the other for energizing the motors to rotate in the opposite direction, and an "off" position; manual means for actuating the switch mechanism into any one of the three positions; said manual means including two arcuate offset cam surfaces connected by a median surface; a cam follower following said surfaces for moving the switch mechanism from an "on" position to the "off" position; said proximal motor, the switch mechanism, the cam follower and the cam surfaces being so arranged that upon the manual means actuating the switch mechanism into one of the "on" positions, the proximal motor drives the cam follower into the median position of the cam surfaces to actuate said switch into the "off" position to deenergize the motors.

3. A control mechanism according to claim 2, wherein the two motors are energized from the secondary winding of a transformer, the switch mechanism when actuated into the "off" position open-circuiting both the primary and the secondary windings of the transformer.

4. A control mechanism according to claim 2, wherein the cam surfaces consist of a continuous arcuate groove in which the cam follower is positioned.

5. A control mechanism according to claim 2, wherein the manual means consists of a rotatably mounted member wherein the switch mechanism is driven through a rotary motion concentric with the manual means.

6. A control mechanism according to claim 2, wherein the proximal motor drives the switch mechanism through a speed reducing mechanism.

7. A control mechanism according to claim 2, wherein the control mechanism is mounted in a housing having a graduated scale and wherein the manual means for actuating the switch mechanism into one of the positions is provided with an indicant registering with the scale to indicate the position of the remote motor when deenergized.

8. A control mechanism for a remotely mounted motor comprising, in combination: a source of electrical energy; a proximal motor connected to the remote motor so that as one of the motors is deenergized the other is also deenergized; each of said motors having two sets of windings; a switch mechanism driven by the proximal motor; said switch mechanism having two "on" positions, one for connecting a first set of windings of each motor directly to said source and for connecting the second set of windings of each motor through an impedance to said source to rotate the motors in one direction; the other "on" position connecting said second set of windings directly to said source and the first set of windings through an impedance to said source to reverse the direction of rotation of the motors; said switch further having an "off" position; manual means for actuating the switch mechanism into any one of the three positions; said manual means including two arcuate offset cam surfaces connected by a median surface; a cam follower for actuating the switch mechanism; said proximal motor, the switch mechanism, the cam follower and the cam surfaces being so arranged that upon the manual means actuating the switch mechanism into one of the "on" positions, the proximal motor drives the cam follower into the median position of the cam surfaces to actuate said switch into the "off" position to deenergize the motors.

9. A control mechanism according to claim 8, wherein the remotely mounted motor and the proximal motor are connected in parallel.

10. A control mechanism for a remotely mounted electric motor comprising, in combination, a housing, a proximal motor in the housing, a source of electrical energy for energizing the remotely mounted electric motor, a switch mechanism driven by the proximal motor, said switch mechanism having three positions, namely, a forward position, a reverse position and an open position, and means for actuating the switch mechanism into any one of the selected positions, said means including a cam follower actuating the switch mechanism into the various positions, a cam member having two concentric cam surfaces, one of which has a larger radius than the other, and a diagonal cam surface for connecting adjacent ends of the concentric cam surfaces, the cam follower when contacting one of the concentric cam surfaces causing the switch to be either in the forward or the reverse position thereby connecting the distal motor to the source of electrical energy, the proximal motor driving the cam follower toward the diagonal cam surface to thereby actuate the switch mechanism into the open position to stop rotation of the distal motor.

References Cited in the file of this patent

UNITED STATES PATENTS 2,712,106     Williams _____ June 28, 1955

FOREIGN PATENTS 960,113     Germany _____ Mar. 14, 1957